US009115618B2

(12) United States Patent
Schonen et al.

(10) Patent No.: US 9,115,618 B2
(45) Date of Patent: Aug. 25, 2015

(54) METHOD FOR THE REGENERATION OF A CARBON PARTICULATE FILTER

(71) Applicant: FEV GmbH, Aachen (DE)

(72) Inventors: Markus Schonen, Langerwehe (DE); Christopher Severin, Braunschweig (DE)

(73) Assignee: FEV GmbH, Aachen (DE)

( * ) Notice: Subject to any disclaimer, the term of this patent is extended or adjusted under 35 U.S.C. 154(b) by 0 days.

(21) Appl. No.: 14/011,455

(22) Filed: Aug. 27, 2013

(65) Prior Publication Data

US 2014/0060010 A1   Mar. 6, 2014

(30) Foreign Application Priority Data

Aug. 28, 2012  (DE) .......................... 10 2012 107 905

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 3/023* | (2006.01) |
| *F01N 9/00* | (2006.01) |
| *F01N 3/025* | (2006.01) |
| *F01N 3/027* | (2006.01) |

(52) U.S. Cl.
CPC ................ *F01N 3/023* (2013.01); *F01N 3/027* (2013.01); *F01N 3/0253* (2013.01); *F01N 9/002* (2013.01); *Y02T 10/47* (2013.01)

(58) Field of Classification Search
USPC ..................... 60/286, 295, 297, 311
See application file for complete search history.

(56) References Cited

U.S. PATENT DOCUMENTS

| 8,347,612 | B2 | 1/2013 | Tewari et al. | |
|---|---|---|---|---|
| 2011/0225949 | A1* | 9/2011 | Tewari et al. | ................... 60/274 |
| 2012/0031080 | A1* | 2/2012 | Barasa | ........................... 60/285 |
| 2013/0276445 | A1* | 10/2013 | Chen et al. | ................... 60/605.1 |

FOREIGN PATENT DOCUMENTS

| DE | 102007027182 A1 | 12/2008 |
|---|---|---|
| DE | 102007031355 A1 | 1/2009 |
| DE | 102011014164 A1 | 12/2011 |
| EP | 2065582 A1 | 6/2009 |

* cited by examiner

*Primary Examiner* — Audrey K Bradley
*Assistant Examiner* — Dapinder Singh
(74) *Attorney, Agent, or Firm* — Gifford, Krass, Sprinkle, Anderson & Citkowski, P.C.

(57) ABSTRACT

Method for the regeneration of a carbon particulate filter 5 in a combustion engine arrangement 1 with a combustion engine 2 and an exhaust-gas aftertreatment device 3, wherein the combustion engine arrangement 1 is switched to a heating operation for increasing the exhaust-gas temperature, which is suitable, to heat the exhaust-gas to a carbon particulate ignition temperature. By means of the operation conditions of the combustion engine arrangement 1, the necessary energy input per carbon particulate mass (specific energy input) is determined and monitored for the regeneration. When falling below a threshold value for the specific energy input, the heating operation for the regeneration of the carbon particulate filter 5 is started.

14 Claims, 3 Drawing Sheets

METHOD FOR THE REGENERATION OF A CARBON PARTICULATE FILTER

CROSS-REFERENCE TO RELATED APPLICATIONS

This application claims priority of German Patent Application 10 2012 107 905.6 filed Aug. 28, 2012, and is herein incorporated by reference in its entirety.

FIELD OF THE INVENTION

The invention relates to a method for the regeneration of a carbon particulate filter in a combustion engine arrangement, with a combustion engine and an exhaust-gas aftertreatment device, wherein the combustion engine arrangement is switched to a heating operation for increasing the exhaust-gas temperature, which is suitable to heat the exhaust-gas to a carbon particulate ignition temperature.

BACKGROUND OF THE INVENTION

It is state of the art, that a carbon particulate filter stores carbon particulate in the so-called adsorption operation. Carbon particulate filters can be used in Diesel engines or in an Otto engine. When using in a Diesel engine, they are also called Diesel particle filters. When the carbon particulate filter is at least nearly completely saturated and no further carbon particulate can be accommodated, it has to be burned off by means of a regeneration. As an input parameter for a control strategy for starting a regeneration, generally a carbon particulate saturation of 80% to 90% of a complete saturation is used. For starting a regeneration, different measures exist, of which one for example is to heat the exhaust-gas additionally by means of corresponding measures, for example by means of a heating operation of the combustion engine arrangement, so that the carbon particulate is heated up to the carbon particulate ignition temperature and is burnt in the filter with the oxygen contained in the exhaust-gas. These control strategies known from the State of the Art have the consequence, that a regeneration has to be started inevitably at the determined saturation limit of 80% to 90% and even then, when the combustion engine is not in a load condition suitable for the regeneration. If the regeneration would not be started, the carbon particulate saturation would further increase and the exhaust-gas back pressure would increase critically. In a forced regeneration, the exhaust-gas can be relatively cool because of an existing partial load operation, so that this has to be heated by means of injection of additional fuel during the heating operation to the necessary temperature. The energy input for heating the carbon particulate filter is thus relatively high. Furthermore, these control strategies regularly lead to the fact, that the regeneration is carried out to the complete carbon particulate burning-off. This can lead to an increased fuel consumption as well as, depending on the method for increasing the temperature, to a dilution of the lubricant oil with fuel.

DE 10 2007 027 182 A1 shows a method for the regeneration of a carbon particulate filter, which foresightfully includes traffic influences into the regeneration strategy. In this case, an input parameter into the method is the average speed of the vehicle. It shall be achieved, that only then a regeneration is started, when this will not have to be stopped prematurely.

EP 2 065 582 B1 shows a method for the regeneration of a carbon particulate filter, which for determining the saturation condition considers the influence of different operating conditions of the vehicle on the filter saturation. In this case values characterising the statistical driving conditions are included in the determination of the saturation condition. Different driving conditions can be idling operation, driving in the countryside or driving on the motorway.

Starting therefrom, it is an object of the present invention to reduce the energy input for the regeneration of a carbon particulate filter.

SUMMARY OF THE INVENTION

The object is met by a method for the regeneration of a carbon particulate filter in a combustion engine arrangement with a combustion engine and an exhaust-gas aftertreatment device, wherein the combustion engine arrangement is switched to a heating operation for increasing the exhaust-gas temperature, which is suitable to heat the exhaust-gas to a carbon particulate ignition temperature, wherein according to the operation condition of the combustion engine arrangement, the energy input per carbon particulate mass, which is necessary for the regeneration as a specific energy input, is determined and monitored, and wherein the heating operation is started for the regeneration of the carbon particulate filter, when the specific energy input falls below a threshold value for the specific energy input.

As in the method according to the invention the regeneration is carried out in phases, in which the specific energy input is as low as possible, i.e. in phases, in which the exhaust-gas temperature and thus the temperature of the carbon particulate filter is at a high level, anyway. Thus, a lower energy input is necessary, to increase the exhaust-gas temperature to the carbon particulate ignition temperature. In this case, a threshold value is used, which relates to that energy input, which is additionally necessary to carry out the regeneration.

This means a reduced fuel consumption compared to common methods. Only a small additional activation energy is necessary, to start and to maintain the regeneration, as for example, during a high load operation, the temperatures in the carbon particulate filter or also in an oxidation catalyst provided generally, are already increased. For starting the heating operation, also the requirement can be necessary, that the load condition of the combustion engine exceeds a defined threshold value. A possible threshold value for the load condition of the combustion engine is at least 50%, preferably at least 70% of a full load of the combustion engine.

Furthermore, an overshooting of a defined threshold of the saturation condition of the carbon particulate filter with carbon particulate can be used as a requirement for starting the heating operation. The threshold value of the saturation condition of the carbon particulate filter is preferably 30% of a full saturation of the carbon particulate filter.

The main point of the control strategy using the method according to the invention are advantageous operating conditions of the combustion engine, for example in form of a high load operation and not primarily the saturation condition of the carbon particulate filter. Thus, a regeneration which considers the fuel consumption can be carried out and further a regeneration does not have to be carried out up to the complete carbon particulate burn-off, but can be stopped during disadvantageous operating conditions under consideration of hysteresis. Advantageously, thus partial regenerations can be carried out and an extension of the interval for a complete conventional regeneration is achieved. Of course a complete regeneration can also be carried out during correspondingly long advantageous regeneration conditions.

A further advantage of the method according to the invention is, that depending on the operating profile of the combustion engine the point of balance of the carbon particulate accumulation in the carbon particulate filter can be adjusted. This means, that by means of repeated partial carbon particulate regenerations a predetermined carbon particulate saturation condition below a maximum allowable carbon particulate saturation condition is not exceeded, so that complete conventional regenerations do not need to be necessary anymore. Of course, besides the regeneration strategy according to the invention, also a common regeneration strategy can be used, to ensure, that, when reaching a nearly complete saturation condition of the carbon particulate filter, a regeneration is carried out anyway.

Further, statistical data of the engine operating profiles can be used as characteristic values as a condition for starting the heating operation. Different engine operating profiles can be the idling operation, driving in the countryside or driving on the motorway.

For determining the specific energy input, a temperature model for determining a heating-up energy for achieving the carbon particulate ignition temperature in the exhaust-gas, a temperature model for determining a heating output during the regeneration and a carbon particulate burning-off model for determining a duration of the regeneration can be used. The temperature model for determining the heating-up energy for achieving the carbon particulate ignition temperature uses at least one of the following starting values: mass of the carbon particulate filter, specific heat capacity of the carbon particulate filter, regeneration temperature of the carbon particulate filter and the actual temperature of the exhaust-gas.

The temperature model for determining the heating output during the regeneration uses at least one of the following input values: exhaust-gas mass flow and specific heat capacity of the exhaust-gas. A further input value can be the actual exhaust-gas temperature.

The carbon particulate burning-off model for determining the duration of the regeneration has at least one of the following input values: carbon particulate mass in the carbon particulate filter, oxygen concentration in the exhaust-gas, activation energy of the carbon particulate in the carbon particulate filter and temperature of the carbon particulate filter.

Preferably, for determining the specific energy input, also driving profile data from a navigation system can be used. Thus, it is foreseeable, whether in the future the specific energy input will be low enough, to be able to carry out a regeneration economically. Thus, the heating operation can be started in good time, when it is foreseeable, that shortly, for example because of an incline a high load operation will occur.

In a preferred embodiment of the method according to the invention, the starting of the heating operation is triggered by means of measures within the combustion engine and/or within the exhaust-gas aftertreatment device. Advantageously, thus, the method for the regeneration can be adapted to the respective configuration of the combustion engine arrangement comprising the combustion engine and the exhaust-gas aftertreatment device.

Preferably, the heating operation is started within the exhaust-gas aftertreatment device by means of at least one of the measures, external fuel injection, operation of a burner device or electric heating of the carbon particulate filter. These measures are individual measures which are technically easy to implement and for which available components can be used.

Preferably, the starting of the heating operation is carried out within the combustion engine by means of at least one of the measures, inlet air choke, adjustment of the injection, additional late after-injection or adjustment of the outlet valves. These measures are individual measures which are technically easy to implement and for which available components can be used.

Preferably, an at least partial continuation of the measures starting the heating operation continues during the carrying out of the heating operation. Thus, the heating operation is efficiently carried out to the end. Furthermore, it can be provided, that one of these described measures, even if it was not involved initially in the starting of the heating operation, is carried out during the heating operation.

In a specific embodiment of the method, the starting of the heating is only then carried out, when falling-below the threshold value for the specific energy input is maintained for at least a defined time period, especially for a period of time of three minutes. Thus, the method ensures, that the exhaust-gas temperature has increased already by means of the normal operation of the combustion engine so far, that by means of the heating operation according to the method only a low additional temperature increase of the exhaust-gas to the carbon particulate ignition temperature of approximately 550° C. has to take place, to start a regeneration.

In a further preferred embodiment of the method, a monitoring of the load condition of the combustion engine is carried out using at least one of the criteria, exhaust-gas temperature, axial temperature gradient across an oxidation catalyst, exhaust-gas mass flow, engine operating parameters, especially load and/or number of revolutions or environmental conditions. Advantageously these measuring values are already available in present combustion engine arrangements and can simply be integrated into control means for carrying out the method according to the invention.

In a further preferred embodiment of the method, the carrying-out of a catalytic process takes place by means of a catalytic coating in the carbon particulate filter. By means of the catalytic process by the catalytic coating, a reduction of the carbon particulate ignition temperature is achieved in an especially advantageous manner, so that, thus, a reduction of the increased fuel consumption caused by the regeneration is enabled.

Preferably, it is provided, that the heating operation is only stopped then, when an upper threshold value for the specific energy input is exceeded, wherein the upper threshold value is above the threshold value for the specific energy input used for starting the heating operation. Thus, a specific hysteresis is realised, which should ensure a minimum duration of the heating operation. The hysteresis can be coupled also to a low pass, so that the heating process is only stopped when the specific energy input is exceeded for the duration of a predetermined time interval.

Furthermore, the object is met by a combustion engine arrangement comprising a combustion engine, an exhaust-gas aftertreatment device and control means, wherein the control means are adapted for carrying out the method according to the invention and wherein the described preferred improvements of the method can be provided.

BRIEF DESCRIPTION OF THE DRAWINGS

In the following the method for the regeneration of a carbon particulate filter and the device for carrying out the method according to the invention are described with reference to the Figures. It shows FIG. 1 a combustion engine arrangement in a principle representation for carrying out the method according to the invention, FIG. 2 the chronological progression of the carbon particulate loading in a partial regeneration, FIG. 3 the chronological progression of the carbon particulate loading in a partial regeneration by means of adjustment of a balance of loading and FIG. 4 a schematical representation of the relationship of different mathematical models for determining the specific energy input.

DETAILED DESCRIPTION OF THE INVENTION

Figure 1:
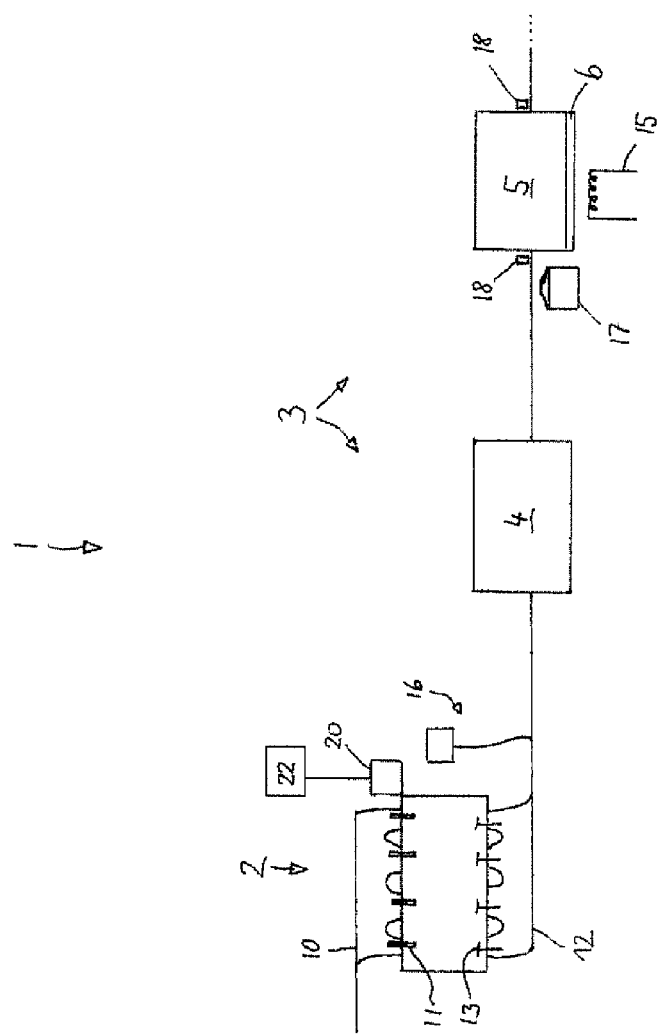

FIG. 1 shows in a principle representation a combustion engine arrangement 1 with a combustion engine 2 and an exhaust-gas aftertreatment device 3. The combustion engine 2 works for example according to the Diesel principle. The exhaust-gas aftertreatment device 3 has an oxidation catalyst 4 and a carbon particulate filter 5, which both can also be designed integrally. The carbon particulate filter 5 has a catalytic coating 6. The method according to the invention can also be carried out without a catalytic coating.

The combustion engine 2 has an inlet air branch 10 with injection valves 11 and an outlet branch 12 with outlet valves 13. The exhaust-gas aftertreatment device 3 has in front of the oxidation catalyst 4 an external fuel injection 16, an electric heating 15 and a burner device 17. It is referred to the fact, that an external fuel injection 16, an electric heating 15 and a burner device 17 do not have to be arranged at the same time especially in the exhaust-gas aftertreatment device 3, to carry out the method according to the invention. Also, only one of the devices or a combination of individuals of the named devices can be provided. For simplification of the present description, however, no variants with only one of these devices are described in the figures.

As shown, a sensor 18 for measuring an exhaust-gas back pressure can respectively be provided in front of or behind the carbon particulate filter 5. By means of a differential pressure measurement a carbon particulate saturation level of the carbon particulate filter 5 can be determined via the sensors 18. Additionally or alternatively thereto, a carbon particulate saturation level can also be predicted by means of the carbon particulate saturation models or via the evaluation of present driving data and environmental data. In addition to the determinable data concerning the carbon particulate saturation level, also the driving route with its geological contour, the traffic conditions, the climatic conditions, like temperature and humidity, along the driving route or also the driver's profile, driver's requirements and driver's habits can be used.

The combustion engine arrangement 1 is provided with control means 20, which control and regulate the method according to the invention for the regeneration.

Figure 2:
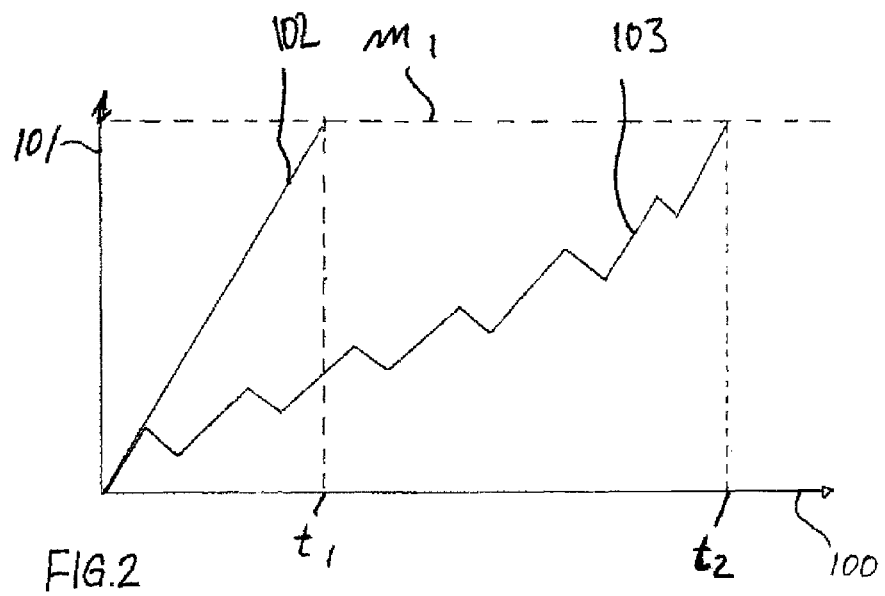
Figure 3:
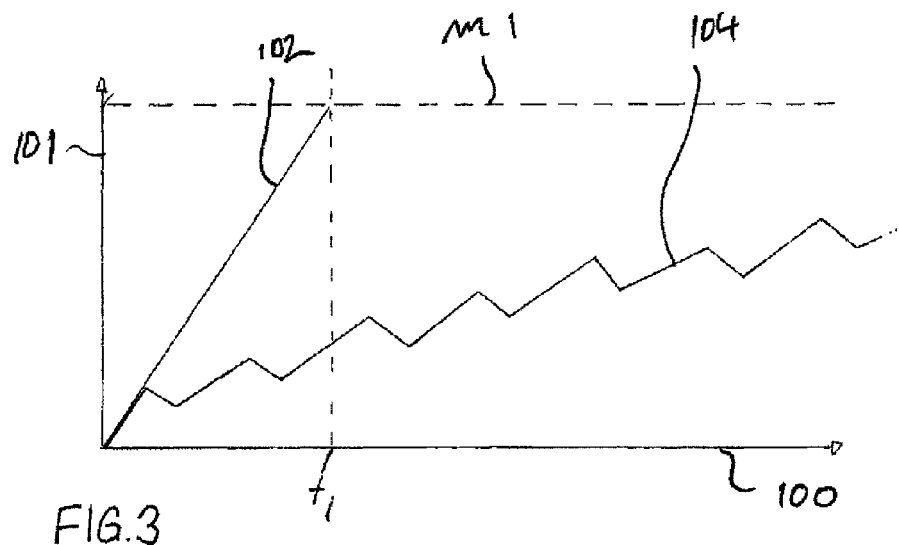

In FIGS. 2 and 3, respectively, over the time on an axis of abscissa (x-coordinate) 100, different progressions 103, 104 of the carbon particulate saturation $m_{Ruβ}$ are shown on an axis of ordinate (y-coordinate) 101. In detail, FIG. 2 shows an extension of the intervals for a complete regeneration and FIG. 3 shows an adjustment of the balance of saturation. In both FIGS. 2 and 3, an upper constant limit $m_1$ is formed by the maximum possible carbon particulate saturation $m_{Ruβ, max}$, which regularly is the determined saturation limit of 80% to 90% of a complete saturation of the carbon particulate filter 5. Furthermore, in both FIGS. 2 and 3, a point of time $t_1 = t_{Regen}$ is shown for the complete conventional regeneration at a 80% to 90% filter saturation and for the conventional strategy for the regeneration. The increase of the carbon particulate saturation in the case of a conventional regeneration at a 80% to 90% filter saturation extends correspondingly approximately as a line 102 from the origin of the saturation progression to the point $t_1/m_1 = t_{Regen}/m_{Ruβ, max}$.

Furthermore, in both FIGS. 2 and 3, respectively, a serrated or saw-tooth like progression 103, 104 of a carbon particulate saturation is shown, which results, when the method according to the invention is used for the regeneration of a carbon particulate filter 5 by means of a heating operation. In both cases, the serrated progression 103, 104 of the carbon particulate saturation is achieved such over time, that a multitude of partial regenerations are carried out, which are used during a distinctly lower carbon particulate saturation level then 80% to 90%, i.e. for example already at a saturation level of 30%, and no complete regeneration is carried out. Furthermore, a longer maintained and further going regeneration, in some cases also a complete regeneration of the filter, is achieved at correspondingly advantageous conditions, like a longer drive at high loading, which is not shown in the diagrams.

In FIG. 2 it is visible, that the progression 103 of the carbon particulate saturation during the regeneration by means of heating achieves the maximum carbon particulate saturation $m_1 = m_{Ruβ, heating}$ at the point of time $t_2 = t_{Regen, heating}$. In this case the point of time $t_2 = t_{Regen, heating}$ lies because of the in the meantime carried out partial regeneration distinctly behind the point of time $t_1 = t_{Regen}$ with a conventional regeneration strategy. According thereto, at this point of time $t_2 = t_{Regen, heating}$, a complete regeneration of the carbon particulate filter 5 should be carried out. The method is controlled by the control means 20.

In FIG. 3 it is visible, that the progression 104 of the carbon particulate saturation is flattened during a regeneration by means of heating and extends also approximately constant after a specific number of regenerations parallel to or below the maximum possible carbon particulate saturation $m_1 = m_{Ruβ, max}$. Therefore a balance of the saturation is achieved in the carbon particulate filter 5. This is caused by a control of the method according to the invention with the control means 20 such, that a partial regeneration is carried out so long till the amount of carbon particulate saturation added since the last partial regeneration is burned off. The medium carbon particulate saturation levels off because of this control of the partial regeneration for example at a carbon particulate saturation level of approximately 50%.

Furthermore, the method according to the invention comprises an emergency plan, which for example when the sensors are defect starts at a high carbon particulate saturation level of the carbon particulate filter, a conventional complete regeneration or a partial regeneration.

Thus, the method according to the invention enables in phases of longer high loading operation a partial regeneration, i.e. starting from the necessary starting criterion of a lower carbon particulate saturation level of the carbon particulate filter of approximately 30% to 60% of a complete carbon particulate saturation. In the method, a lower additional activation energy is sufficient, to start and to maintain the regeneration. The method can be implemented in common systems for the exhaust-gas aftertreatment.

Figure 4:
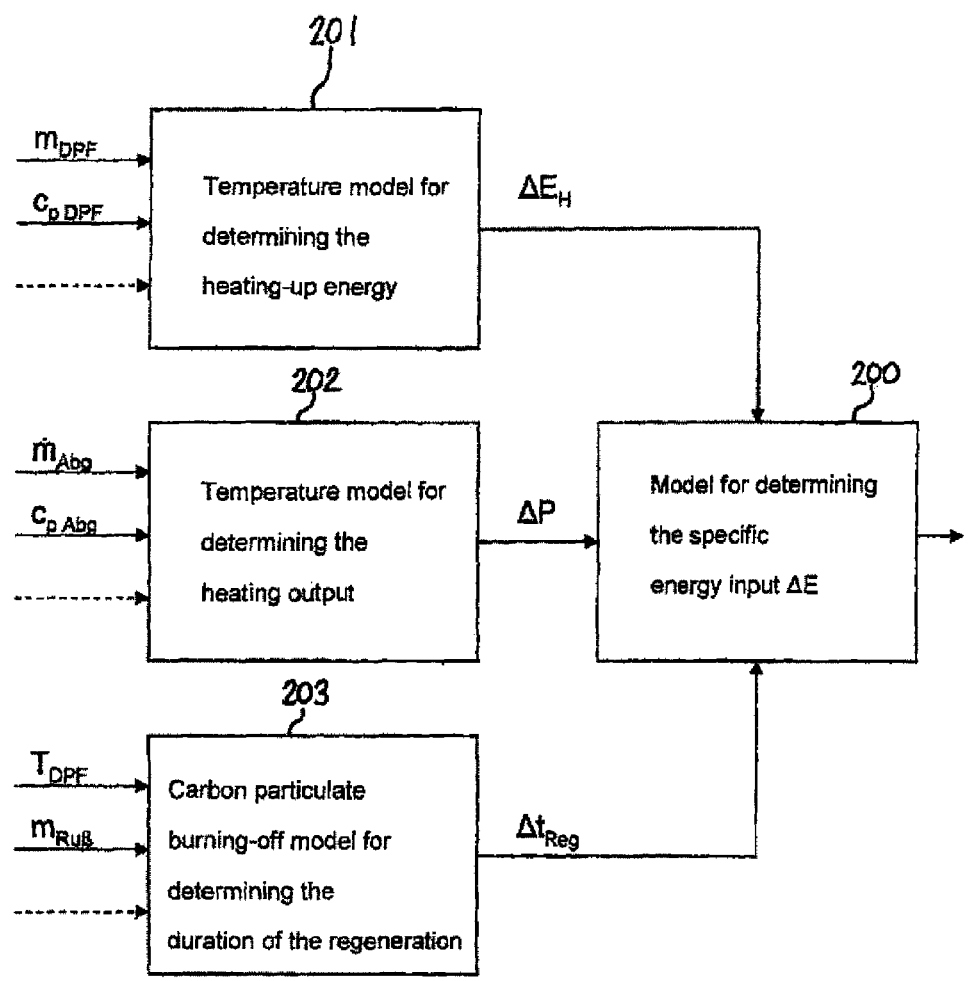

FIG. 4 shows a schematical representation of the relationship of different mathematical models for determining the specific energy input. The necessary energy input per carbon particulate mass (specific energy input) for the regeneration is determined by means of a model 200. A calibration of the determined specific energy input with a predetermined threshold value leads to a regeneration requirement for starting the heating operation of the combustion engine arrangement.

At least three values are input to the model 200 for determining the specific energy input, namely the heating-up energy $\Delta E_H$, which is necessary, to heat the carbon particulate filter up to the carbon particulate ignition temperature in the exhaust-gas, the heating output $\Delta P$, which is necessary during the regeneration, and the duration of the regeneration $\Delta t_{Reg}$. Furthermore, also further data can be used as input values, as for example the statistical data of the engine operation profile or the specific data concerning the energy input on the basis of the driving profile data of a navigation system or a GPS-system 22.

For determining the heating-up energy $\Delta E_H$, a temperature model 201 is used, which has different input values, for example the mass $m_{DPF}$ of the carbon particulate filter and the specific heat capacity $c_{p\ DPF}$ of the carbon particulate filter. Further input values can be the regeneration temperature of the carbon particulate filter as well as the actual exhaust-gas temperature.

For determining the heating output $\Delta P$ a temperature model 202 is used, which has different input values, like for example the exhaust-gas mass flow $\dot{m}_{Abg}$ and the specific heat capacity $c_{p\ Abg}$ of the exhaust-gas. Furthermore, further values can be used, like for example the temperature difference across a catalyst.

For the determining the duration of the regeneration $\Delta t_{Reg}$, the temperature $T_{DPF}$ of the carbon particulate filter and the carbon particulate mass $m_{Ru\beta}$ in the carbon particulate filter can be used as input values. Further input values can be the oxygen concentration in the exhaust-gas or the activation energy of the carbon particulate in the carbon particulate filter.

The invention claimed is:

1. A method for regeneration, the method comprising the following steps:
   providing a combustion engine arrangement having a combustion engine, an exhaust-gas after treatment device, and a carbon particulate filter provided in an exhaust passage of the combustion engine,
   switching the combustion engine arrangement to a heating operation for increasing the exhaust-gas temperature, which is suitable to heat the exhaust-gas to a carbon particulate ignition temperature,
   determining and monitoring a specific energy input as an energy input per carbon particulate mass necessary for regeneration, the specific energy input based on an operation condition of the combustion engine arrangement, and
   heating the exhaust-gas to the carbon particulate ignition temperature and regenerating the carbon particulate filter by igniting the carbon particulate using the heated exhaust-gas in response to the specific energy input falling below a threshold value for the specific energy input.

2. The method according to claim 1, wherein
   starting of the heating operation further depends on statistical data of an engine operation profile.

3. The method according to claim 1, wherein
   the heating operation is carried out by measures within at least one of the combustion engine and within the exhaust-gas aftertreatment device.

4. The method according to claim 1, wherein
   the heating operation is only terminated when an upper threshold value for the specific energy input is exceeded, wherein the upper threshold value lies above the threshold value for the specific energy input used for starting the heating operation.

5. The method according to claim 1, wherein
   the heating operation for the regeneration of the carbon particulate filter is only started when a saturation condition of the carbon particulate filter exceeds a defined threshold value.

6. The method according to claim 5, wherein
   the threshold value of the saturation condition of the carbon particulate filter is at least 30% of a complete saturation of the carbon particulate filter.

7. The method according to claim 1, wherein
   the specific energy input is determined, using:
   a temperature model for determining a heating-up energy for achieving the carbon particulate ignition temperature in the exhaust-gas,
   a temperature model for determining a heating output during the regeneration,
   and a carbon particulate burning-off model for determining a duration of the regeneration.

8. The method according to claim 7, wherein
   driving profile data from a navigation system are further used for determining the specific energy input.

9. The method according to claim 1, wherein
   the heating operation is only started when falling-below the threshold value for the specific energy input is maintained at least for a defined time interval.

10. The method according to claim 9, wherein a defined time interval is at least 3 minutes.

11. The method according to claim 1, wherein
    the heating operation for the regeneration of the carbon particulate filter is only started when the load condition of the combustion engine exceeds a defined threshold value.

12. The method according to claim 11, wherein
    the threshold value of the load condition of the combustion engine is at least 50% of a full load of the combustion engine.

13. The method according to claim 11, wherein the threshold value of the load condition of the combustion engine is at least 70% of a full load of the combustion engine.

14. A method for a regeneration of a carbon particulate filter in a combustion engine arrangement provided with a combustion engine and an exhaust-gas aftertreatment device, the carbon particulate filter provided in an exhaust passage of the combustion engine, the method comprising the following steps:
    switching the combustion engine arrangement to a heating operation for increasing the exhaust-gas temperature, which is suitable to heat the exhaust-gas to a carbon particulate ignition temperature,
    determining and monitoring a specific energy input as an energy input per carbon particulate mass necessary for regeneration, the specific energy input based on an operation condition of the combustion engine arrangement, and
    heating the exhaust-gas to the carbon particulate ignition temperature and regenerating the carbon particulate filter by igniting the carbon particulate using the heated exhaust-gas in response to the specific energy input falling below a threshold value for the specific energy input.

* * * * *